United States Patent [19]

Parker

[11] Patent Number: 4,463,385
[45] Date of Patent: Jul. 31, 1984

[54] KINESCOPE BLACK LEVEL CURRENT SENSING APPARATUS

[75] Inventor: Robert P. Parker, Indianapolis, Ind.

[73] Assignee: RCA Corporation, New York, N.Y.

[21] Appl. No.: 394,422

[22] Filed: Jul. 1, 1982

[51] Int. Cl.³ .................. H04N 5/68; H04N 3/24; H04N 9/20; H04N 3/24
[52] U.S. Cl. .................................. 358/242; 358/33; 358/65; 358/165
[58] Field of Search .................. 358/33, 34, 65, 172, 358/242, 243, 165

[56] References Cited

U.S. PATENT DOCUMENTS

| | | | |
|---|---|---|---|
| 4,012,775 | 3/1977 | Smith | 358/29 |
| 4,160,995 | 7/1979 | Jensen | 358/29 |
| 4,207,592 | 6/1980 | Harwood | 350/34 |
| 4,224,640 | 9/1980 | Hovens et al. | 358/242 |
| 4,237,479 | 12/1980 | Lavigne | 358/33 |
| 4,263,622 | 4/1981 | Hinn | 358/242 |
| 4,277,798 | 7/1981 | Hinn | 358/33 |
| 4,319,166 | 3/1982 | Lavigne | 315/384 |
| 4,387,405 | 6/1983 | Hinn | 358/243 |

OTHER PUBLICATIONS

An article "Permanent Color Truth"—E. A. Jensen (from a publication by Bang & Olufsen, Denmark).
An article "Color Receiver Design"—E. A. Jensen (Wireless World, Jul. 1978).

Primary Examiner—John C. Martin
Assistant Examiner—John K. Peng
Attorney, Agent, or Firm—Eugene M. Whitacre; Paul J. Rasmussen; Ronald H. Kurdyla

[57] ABSTRACT

In a television receiver including an automatic kinescope bias (AKB) control system, a kinescope cathode is driven by a video output amplifier. A feedback network is provided from the output to the input of the amplifier. A sensing resistor is included in the main current conduction path of the amplifier. During AKB operating intervals, a cathode output signal proportional to the cathode black current level is coupled via the feedback network for varying the amplifier conduction such that a voltage developed across the sensing resistor is proportional to the black current representative cathode output signal. This voltage is utilized to control the cathode bias to maintain a desired black current level.

9 Claims, 1 Drawing Figure

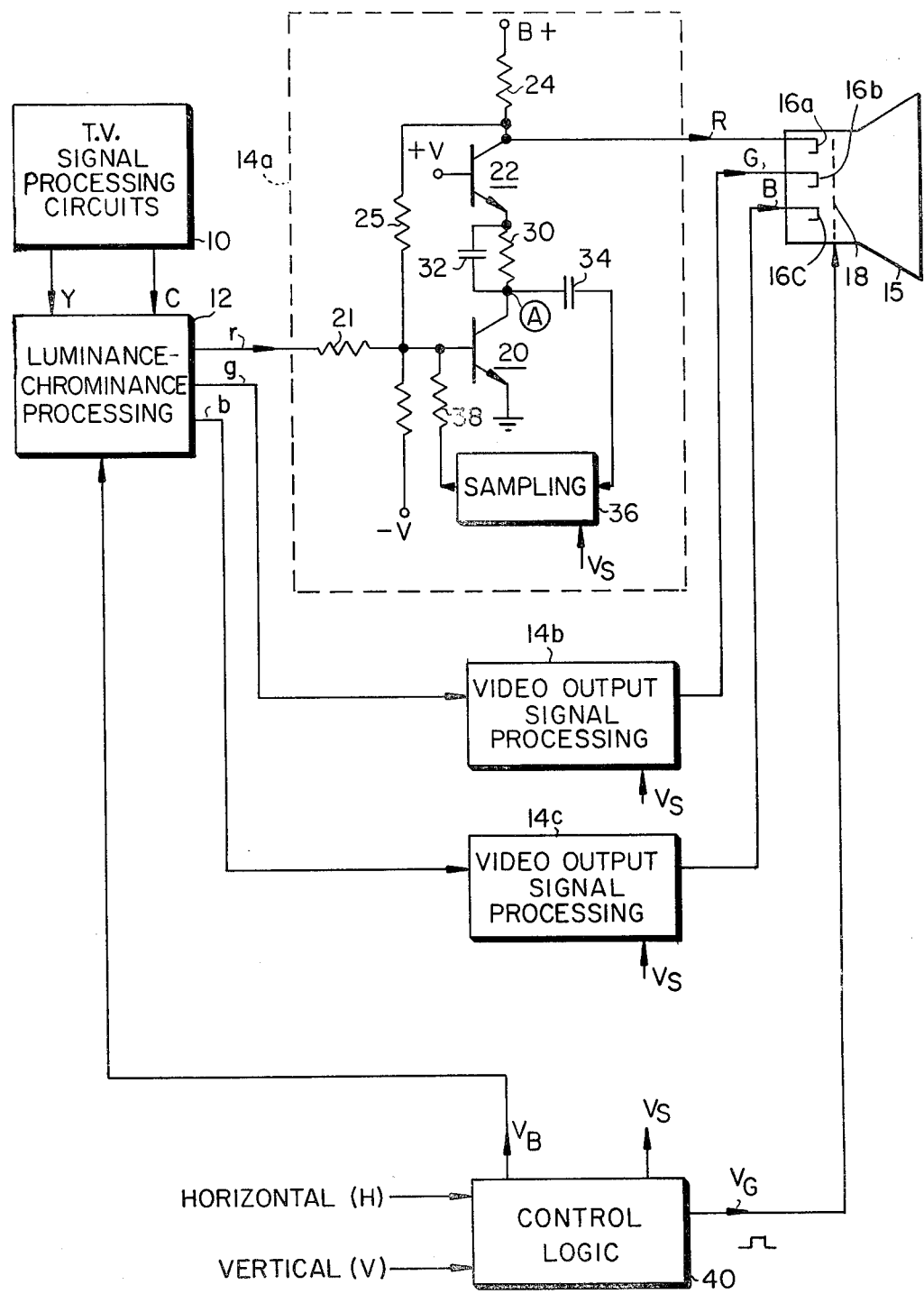

KINESCOPE BLACK LEVEL CURRENT SENSING APPARATUS

This invention concerns a kinescope driver amplifier arranged for sensing the level of black image representative current conducted by an image reproducing device in a video signal processing system such as a television receiver.

Television receivers sometimes employ an automatic kinescope bias (AKB) control system for automatically establishing the proper black image representative current levels for each electron gun of the kinescope. As a result of this operation, the reproduced picture is prevented from being adversely affected by variations of kinescope bias from a desired level (e.g., due to aging and temperature effects). AKB systems are disclosed, for example, in U.S. Pat. Nos. 4,263,622 and 4,277,798, both issued to Werner Hinn.

An AKB system typically operates during image retrace blanking intervals, at which time the kinescope conducts a small black level representative blanking current. This current is monitored by the AKB system to generate a correction voltage representing the difference between the sensed black current level and a desired black current level. The correction voltage is applied to video signal processing circuits preceding the kinescope with a sense for reducing the difference.

Various techniques are known for sensing the level of black current conducted by the kinescope. One approach employs a high voltage PNP transistor coupled to the kinescope cathode signal coupling path for directly sensing the cathode black level current conducted during kinescope blanking intervals. Another approach senses the cathode black level current by sensing the voltage developed across an output impedance associated with an active load network of a kinescope driver amplifier. It is also known to derive a voltage representative of the black level current by means of a series resistor-capacitor network coupled from the output of the kinescope driver stage to the input of a sampling amplifier. These approaches suffer from one or more disadvantages related to cost, complexity, or performance.

In accordance with the principles of the present invention, the kinescope cathode is driven by a video output amplifier with a DC feedback path from the output to the input of the amplifier, and with a sensing impedance included in the main current conduction path of the amplifier. Black level cathode current variations are transmitted to the sensing impedance via the feedback path such that a voltage representative of such variations is developed across the impedance. The representative voltage is then processed to develop a bias control voltage which is used to maintain a desired cathode black current level.

In accordance with a feature of the invention, the video output amplifier comprises an input transistor arranged in a cascode configuration with a common base output transistor. The load for the output transistor includes the kinescope cathode to be driven with video signals, and an output impedance coupled to a high voltage supply. Direct current feedback is provided from the output of the output transistor to the input of the input transistor. The sensing impedance is connected at a low voltage point between the input and output transistors.

The single FIGURE of the drawing shows a portion of a color television receiver, including an AKB system with an associated sensing network according to the present invention.

Television signal processing circuits 10 provide separated luminance (y) and chrominance (C) components of a composite color television signal to a luminance-chrominance signal processor 12. Processor 12 includes luminance and chrominance gain control circuits, DC level setting circuits (e.g., comprising keyed clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing network 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the AKB operation, as will be discussed. In this example, kinescope 15 is of the self-converging in-line gun type with a commonly energized grid 18 associated with each of the electron guns comprising cathode electrodes 16a, 16b and 16c.

Since output signal processors 14a, 14b and 14c are similar in this embodiment, the following discussion of the operation of processor 14a also applies to processors 14b and 14c.

Processor 14a includes a kinescope driver stage comprising an input common emitter transistor 20 which receives video signal from processor 12 via an input impedance 21, and an output voltage common base transistor 22 which forms a cascode signal amplifier stage with transistor 20. High level video signal R suitable for driving kinescope cathode 16a is developed across a load resistor 24 in the collector output circuit of transistor 22. A high operating potential for driver 20, 22 is provided by a source of positive DC potential B+ (e.g., +230 volts). Direct current negative feedback is provided from the collector output of transistor 22 to the base input of transistor 20 by means of a resistor 25. The signal gain of cascode amplifier 20, 22 is primarily determined by the ratio of the value of feedback resistor 25 to the value of the input impedance of driver 20, 22 comprising a resistor 21. The feedback network provides a suitably low amplifier output impedance, and assists to stabilize the DC operating level at the amplifier output.

As so far described, cascode video driver amplifier 20, 22 is conventional in nature. In accordance with the present invention, a sensing resistor 30 is DC coupled in series with and between the collector-emitter paths of transistor 20, 22. Resistor 30 serves to develop a voltage at a node A at the collector of transistor 20 representing the level of kinescope cathode black current conducted during kinescope blanking intervals. Resistor 30 functions in conjunction with the AKB system of the receiver, which will now be described.

A control logic unit 40 responds to a horizontal synchronizing rate signal (H) and to a vertical synchronizing rate signal (V), both derived from deflection circuits of the receiver, for generating periodic timing signals $V_B$, $V_S$ and $V_G$ which control the operation of the AKB function during the periodic AKB intervals. The AKB interval begins shortly after the end of each video signal vertical retrace interval within the vertical blanking interval, and encompasses several horizontal line intervals also within the vertical blanking interval and during which video signal image information is absent as shown, for example in U.S. Pat. Nos. 4,263,622 and 4,277,798, both of Werner Hinn.

Timing signal $V_B$ is generated shortly after the end of the vertical retrace interval, and exists for the duration of the AKB interval. This signal is applied to an input blanking control terminal of luminance-chrominance processor 12 for causing the r, g and b outputs of processor 12 to exhibit a DC reference voltage corresponding to black video signal information. This is accomplished by reducing the signal gain of processor 12 to substantially zero via the gain control circuits of processor 12 in response to signal $V_B$, and by modifying the DC level of the video signal processing paths via the DC level control circuits of processor 12 to produce a black representative reference voltage at the outputs of processor 12.

Timing signal $V_S$ occurs durng the AKB interval and enables sampling circuits within processors 14a, 14b and 14c to operate for developing an output bias control signal representative of the kinescope black current.

Timing signal $V_G$, a positive grid drive pulse, is developed during a prescribed portion of the AKB interval (e.g., comprising two horizontal line intervals within the vertical blanking interval).

During each AKB interval, positive pulse $V_G$ forward biases grid 18 of the kinescope, thereby causing the electron gun comprising cathode 16a and grid 18 to increase conduction. In response to grid pulse $V_G$ a similarly phased, positive current pulse appears at cathode 16a during the grid pulse interval. The amplitude of the cathode output current pulse is proportional to the level of cathode black current conduction (typically a few microamperes).

The induced positive cathode output pulse appears at the collector of transistor 22, causing its collector voltage to increase while the cathode pulse is present. This voltage increase is fed back to the base input of transistor 20 through resistor 25, causing the current conduction of transistor 20 to increase proportionally while the cathode pulse is present. The increased current conducted by transistor 20 causes a voltage to be developed across sensing resistor 30. This voltage is in the form of a negative-going voltage pulse which appears at a node A and which is proportional in magnitude to the magnitude of the black level representative cathode output pulse. The magnitude of this voltage pulse is determined by the product of the value of resistor 30 times the magnitude of the current flowing through resistor 30. Thus by feedback action the black level representative cathode output pulse is translated to a low voltage circuit point at the collector of transistor 20, from which it can be easily utilized by subsequent bias control circuits. A capacitor 32 coupled across sense resistor 30 compensates for the parasitic collector-to-base capacitance of transistor 20, to preserve the desired high frequency response of amplifier 20, 22 with respect to normal video signal processing.

The value of resistor 30 is not critical. Larger values of resistor 30 advantageously result in recovered pulses of larger magnitude developed at node A. However, the value of resistor 30 should not be too large, or input transistor 20 may saturate under normal signal processing conditions when conducting heavily in response to large video signals.

The recovered black current representative voltage pulse is coupled from node A via an AC coupling capacitor 34 to a sampling and control signal processing network 36. Keyed sample and hold circuits within network 36 are enabled by sampling timing signal $V_S$ for developing a DC bias control voltage proportional to the voltage pulse developed at node A. The bias control voltage is stored and is applied via a resistor 38 to a bias control input at the base of transistor 20 for maintaining a desired cathode bias voltage corresponding to a desired black level cathode current. Illustratively, if the magnitude of the induced cathode output pulse corresponds to a condition of excessive black level current, the bias control voltage decreases to thereby increase the bias voltage of cathode 16a at the collector of transistor 22. This reduces the black current level to the correct level.

Network 36 can employ signal sample and hold networks of the type described in my U.S. Pat. No. 4,331,981, titled "Linear High Gain Sampling Amplifier" and in my U.S. Pat. No. 4,331,982 titled "Sample and Hold Circuit Particularly for Small Signals", both incorporated herein by reference. Network 36 may also employ sampling and control voltage processing circuits of the type shown in U.S. Pat. No. 4,277,798 of Werner Hinn titled "Automatic Kinescope Biasing System with Increased Interference Immunity", also incorporated hereby by reference.

The described sensing arrangement is advantageous in that it represents an economical technique for developing a cathode black current representative signal at a low voltage point from which the representative signal can be conveniently sensed. A low voltage sensing point is desirable since a low voltage point is compatible with the typically low voltage input requirements of subsequent signal processing circuits (e.g., as included in sampling network 36), which may be constructed as an integrated circuit.

The principles of the present invention are applicable to other kinescope driver amplifier configurations (i.e., other than cascode amplifiers). Illustratively, the kinescope driver may comprise a single common emitter transistor with a video signal base input, a collector output coupled to the kinescope cathode and to a high voltage supply via a load impedance, an emitter circuit, and DC negative feedback coupled from the collector to the base of the transistor. In such case the sensing resistor (corresponding to resistor 30) can be included in the emitter circuit, between the emitter of the transistor and a point of reference potential, such that the black current representative voltage pulse is sensed from the low voltage emitter circuit.

What is claimed is:

1. In a video signal processing system including an image reproducing device responsive to video signals supplied via a video signal path to an intensity control electrode thereof, apparatus comprising:
   driver amplifier means included in said video path and having a first terminal for receiving video signals to be amplified, a second terminal coupled to said intensity control electrode for supplying amplified video signals thereto, and a third terminal coupled to a reference potential and with said second terminal defining a main current conduction path of said amplifier means;
   feedback means coupled from said second terminal to said first terminal of said amplifier means;

bias control means, operative during video signal image blanking intervals and responsive to a signal having a magnitude representative of black level current conducted by said intensity control electrode during image blanking intervals, for providing a control voltage derived from said representative signal to said video signal path for automatically controlling the bias of said image reproducing device to maintain a desired level of black current;

sensing means comprising a sensing impedance for receiving, via said feedback means, current variations representative of black level current variations manifested at said second terminal of said amplifier means so that said sensing impedance develops said signal representative of black current variations; and means for coupling said developed representative signal to said control means.

2. Apparatus according to claim 1, wherein said second terminal of said amplifier means and said intensity control electrode are coupled via a load impedance to a high voltage operating supply; and said sensing impedance is coupled to a portion of said amplifier means remote from said coupling to said high voltage supply.

3. Apparatus according to claim 2, wherein
said sensing impedance comprises a resistor included in the main current conduction path of said amplifier means.

4. Apparatus according to claim 1, wherein said amplifier means comprises a cascode amplifier including:

a first transistor with a first electrode for receiving video signals to be amplified, a second electrode, and a third electrode coupled to a reference potential;

a second transistor with a first electrode coupled to a bias voltage, a second electrode coupled to a high voltage operating supply via a load impedance and coupled to said intensity control electrode for supplying amplified video signal thereto, and a third electrode coupled to said second electrode of said first transistor; and wherein said feedback means is coupled from said second electrode of said second transistor to said first electrode of said first transistor; and said sensing impedance is coupled between said second electrode of said first transistor and said third electrode of said second transistor.

5. Apparatus according to claim 4, wherein
said first and second transistors are like conductivity type devices;

said first, second and third electrodes of said first and second transistors respectively correspond to base, collector and emitter electrodes;

said sensing impedance comprises a resistor; and
said feedback means comprises a DC coupled resistor.

6. Apparatus according to claim 1, wherein
said image reproducing device is a kinescope including an electron gun comprising a grid electrode and an associated cathode intensity control electrode;

said bias control means includes means for biasing said kinescope electron gun during said image blanking intervals to induce a cathode output signal with a magnitude proportional to the level of cathode black current; and said induced cathode output signal is transmitted via said feedback means to said sensing impedance for causing said sensing impedance to develop said representative signal, proportional to said induced cathode output signal.

7. Apparatus according to claim 6, wherein
said biasing means supplies an excitation signal to said kinescope grid electrode for inducing said cathode output signal.

8. Apparatus according to claim 1, wherein
said amplifier means comprises a cascode amplifier including
a first transistor with a first electrode for receiving video signals to be amplified, a second electrode, and a third electrode coupled to a reference potential; and a second transistor with a first electrode coupled to a bias voltage, a second electrode coupled to a high voltage operating supply via a load impedance and coupled to said intensity control electrode for supplying amplified signals thereto, and a third electrode coupled to said second electrode of said first transistor;

said feedback means is coupled from said second electrode of said second transistor to said first electrode of said first transistor;

said sensing impedance is coupled between said second electrode of said first transistor and said third electrode of said second transistor;

said image reproducing device is a kinescope with an electron gun comprising a grid electrode and an associated cathode intensity control electrode;

said bias control means includes means for forward biasing said kinescope electron gun during said image blanking intervals to induce a cathode output signal with a magnitude proportional to the level of cathode black current; and said induced cathode output signal is transmitted via said feedback means to said sensing impedance for causing said sensing impedance to develop said representative signal, proportional to said induced cathode output signal.

9. Apparatus according to claim 8, wherein
said first and second transistors are like conductivity type devices;

said first, second and third electrodes of said first and second transistors respectively corresponds to base, collector and emitter electrodes;

said sensing impedance comprises a resistor; and
said forward biasing means supplies an excitation signal to said kinescope grid electrode for inducing said cathode output signal.

* * * * *